H. B. ROBINSON.
HOSE COUPLING.
APPLICATION FILED AUG. 25, 1917.

1,278,020.

Patented Sept. 3, 1918.

WITNESSES
R. E. Rousseau
L. C. Wilcox

INVENTOR
H. B. Robinson,

BY Victor J. Evans
ATTORNEY

UNITED STATES PATENT OFFICE.

HARRY B. ROBINSON, OF MUSKEGON, MICHIGAN.

HOSE-COUPLING.

1,278,020.
Specification of Letters Patent.
Patented Sept. 3, 1918.

Application filed August 25, 1917. Serial No. 188,117.

*To all whom it may concern:*

Be it known that I, HARRY B. ROBINSON, a citizen of the United States, residing at Muskegon, in the county of Muskegon and State of Michigan, have invented new and useful Improvements in Hose-Couplings, of which the following is a specification.

This invention relates to hose couplings and it consists in the novel features hereinafter described and claimed.

An object of the invention is to provide a hose coupling of simple and durable structure comprising two members pivotally connected together, one of the said members having a spring pressed ball adapted to automatically close the same when the coupling members are swung away from each other and the other having a nipple adapted to engage the said ball and move the same from its pivot when the coupling members are brought together whereby a passageway is established between the two members of the coupling.

In the accompanying drawing:—

Figure 1:
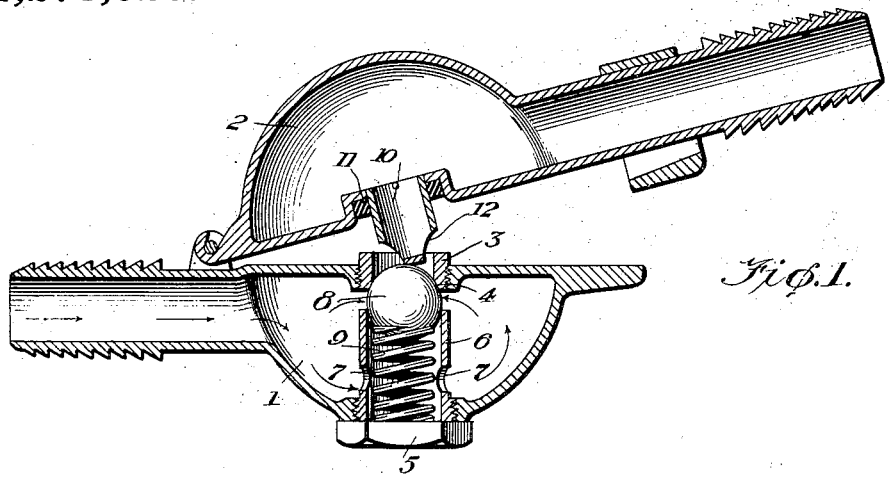
Figure 1 is a longitudinal sectional view of the hose coupling showing the ball valve closed.
Figure 2:
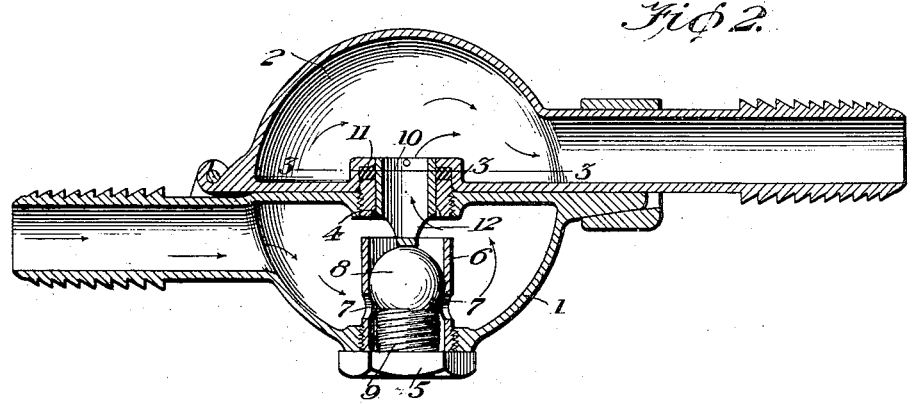
Fig. 2 is a similar view showing the ball valve open.
Figure 3:
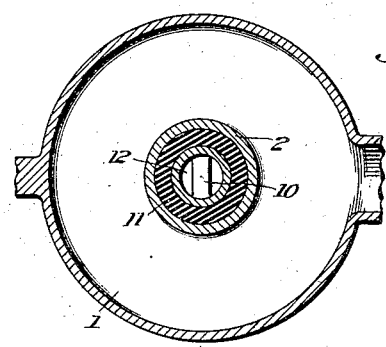
Fig. 3 is a detailed sectional view cut on the line 3—3 of Fig. 2.

The hose coupling comprises members 1 and 2 which may move pivotally with relation to each other. These members are provided with end portions with which the ends of hose sections may be connected in the usual manner. The member 1 is provided with a centrally positioned collar 3 having at its lower side a valve seat 4. A plug 5 is screwed in the side of the member 1 and carries a tube 6, the said tube being provided at its sides with openings 7. A ball 8 is located in the upper portion of the tube 6 and a spring 9 is interposed between the said ball and the plug 5 and is under tension with a tendency to normally hold the ball 8 in contact with the seat 4 of the collar 3. The opening 7 may permit the fluid to enter tube 6 and assist the spring in holding the ball against the seat 4.

The member 2 is provided with a centrally positioned nipple 10 which is surrounded by a packing 11. The nipple 10 is provided at its side with openings 12. When the members 1 and 2 are swung toward each other or closed with relation to each other, the nipple 10 engages the ball 8 and forces the same away from the seat 4 against the tension of the spring 9 and the packing 11 comes in contact with the upper edge of the collar 3. Thus the passageway for air or liquid is established through the coupling and as soon as the coupling member 2 is swung away from the member 1 the ball 8 is moved back against the seat 4 of the collar 3 under the influence of the spring 9 and thus the outlet opening of the member 1 is closed.

From the foregoing description taken in conjunction with the accompanying drawing, it will be seen that a hose coupling of simple and durable structure is provided and that the members thereof are provided with means for automatically establishing a passageway through the said members when they are coupled together and one of the members is provided with means for automatically closing the said passageway when the said coupling members are swung away from each other.

Having described the invention what is claimed is:—

1. A coupling comprising members having portions adapted to be connected with hose, a collar located in one member and provided with a seat, a plug screwthreaded in said member, a tube carried by the plug and provided with side openings, a ball located in the tube, a spring located in the tube and bearing against the ball and plug and adapted to normally hold the ball against the seat of the collar, and a nipple located in the other member and provided with openings and adapted to engage the ball and move the same away from the seat.

2. A coupling comprising members having portions for connection with hose, a collar located in one member and provided with a seat, a tube located in the member and provided with side openings, a ball located in the tube, a spring located in the tube and bearing against the ball and adapted to normally hold the ball in contact with the seat of the collar, a nipple located in the other member and having side openings and a passage surrounding the nipple and adapted to engage the collar when the members are moved to a closed position.

In testimony whereof I affix my signature.

HARRY B. ROBINSON.